(12) United States Patent
Ferrara et al.

(10) Patent No.: US 6,804,577 B2
(45) Date of Patent: Oct. 12, 2004

(54) REPLY MAIL PROCESSING SYSTEM

(75) Inventors: Robert V. Ferrara, Mamaroneck, NY (US); Ronald K. Rutledge, Shelton, CT (US); Martin A. Connelly, Orange, CT (US); Steven J. Shapiro, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 191 days.

(21) Appl. No.: 10/184,235

(22) Filed: Jun. 26, 2002

(65) Prior Publication Data

US 2002/0169519 A1 Nov. 14, 2002

Related U.S. Application Data

(63) Continuation-in-part of application No. 09/626,953, filed on Jul. 27, 2000, now Pat. No. 6,459,953.

(51) Int. Cl.[7] .............................................. G06F 7/00
(52) U.S. Cl. ..................... 700/224; 700/223; 700/226
(58) Field of Search ................................. 700/223, 224, 700/225, 226; 209/564, 583, 584, 900

(56) References Cited

U.S. PATENT DOCUMENTS

| | | | |
|---|---|---|---|
| 4,445,635 A | * 5/1984 | Barr | 229/302 |
| 4,978,114 A | 12/1990 | Holbrook | |
| 5,169,061 A | 12/1992 | Buescher | |
| 5,368,287 A | 11/1994 | Belec et al. | |
| 5,420,403 A | 5/1995 | Allum et al. | |
| 5,459,670 A | 10/1995 | Johnson et al. | |
| 5,563,955 A | * 10/1996 | Bass et al. | 382/101 |
| 5,749,473 A | 5/1998 | Yamashita et al. | |
| 5,901,855 A | 5/1999 | Uno et al. | |
| 5,990,438 A | 11/1999 | Yamashita et al. | |
| 6,054,666 A | 4/2000 | Yamashita et al. | |
| 6,107,589 A | 8/2000 | Yamashita et al. | |
| 6,112,193 A | 8/2000 | Dlugos et al. | |
| 6,166,346 A | 12/2000 | Yamashita et al. | |
| 6,223,168 B1 | 4/2001 | McGurl et al. | |
| 6,260,762 B1 | 7/2001 | Lohmann | |
| 6,276,679 B1 | 8/2001 | Joyce et al. | |

* cited by examiner

*Primary Examiner*—Gene O. Crawford
(74) *Attorney, Agent, or Firm*—Brian A. Lemm; Angelo N. Chaclas

(57) ABSTRACT

A business reply mail processing system is provided. A transport module feeds a business reply mail piece in a path of travel where the business reply mail piece includes a job ID code and field data. A scanner module scans the business reply mail piece to read the job ID code and the field data. A control module uses the job ID code to access processing data from a mail campaign job database corresponding to the job ID code and controls the scanner module using the processing data to read the field data from the business reply mail piece. Alternatively, the business reply mail piece includes the processing data that is read by the scanner and the control module uses the processing data read from the business reply mail piece to read the field data from the business reply mail piece.

19 Claims, 15 Drawing Sheets

SUBSCRIBER SAVINGS VOUCHER

| COVER PRICE | YOU SAVE* | YOUR DISCOUNT RATE |
|---|---|---|
| $4.95 | $3.67 | $1.28 |

*Best Deal* →  ❑ 3 years (78 issues) for $1.28 an issue
❑ 17 issues for $1.41 an issue
❑ Payment enclosed.   ❑ Bill me.

MR./ MRS./ M.S. _____
COMPANY _____
STREET _____
CITY _____ STATE ____ ZIP ____

SAVE 74%*

Forbes

FIG. 2B
(Prior Art)

**We've got a great offer for *you*.**

Complete and return this card to receive your FREE copy of the *2000 Robert Half Salary Guide* and find out how to attract and keep top talent.

Name _____ Title _____

Company _____ Email Address _____

Address _____ What industry best describes your company's primary line of business?

City _____ State _____ Zip Code _____

How many people does your company employ?
- ❏ Less than 50
- ❏ 50-99
- ❏ 100-249
- ❏ 250-499
- ❏ 500-999
- ❏ 1000 or more Telephone _____ Fax _____

How often, if at all, does your company use a recruiting firm?
- ❏ Never
- ❏ Daily
- ❏ Weekly
- ❏ Monthly
- ❏ Quarterly
- ❏ Yearly

ROBERT HALF®
*Specialized Financial Recruiting*℠

800-474-4253 • www.roberthalf.com

© RKH V/COY-H

Reader Service Card / FREE Information

*To receive FREE Information on a company's product/service, check ✔ name:*

- ☐ 1. AccuDocs
- ☐ 2. Archer Management
- ☐ 3. Ascom Hasler
- ☐ 4. Astro Machine Corp.
- ☐ 5. Axode
- ☐ 6. Baldwin Document
- ☐ 7. BCC Software
- ☐ 8. Bell & Howell
- ☐ 9. Block & Co.
- ☐ 10. BOWE Systec
- ☐ 11. Buhrs Americas
- ☐ 12. BUSKRO USA
- ☐ 13. Chamstrom Co.
- ☐ 14. Datatech, Inc.
- ☐ 15. Disticom
- ☐ 16. Dynaric, Inc.
- ☐ 17. EMC Document Systems
- ☐ 18. Energy Savings Prod.
- ☐ 19. Envelope Manager
- ☐ 20. Firstlogic
- ☐ 21. GBR Systems Corp.
- ☐ 22. Global Mail
- ☐ 23. Glue-Fold, Inc.
- ☐ 24. Group 1 Software
- ☐ 25. Hewlett-Packard
- ☐ 26. InTelmail
- ☐ 27. ISIS Papyrus
- ☐ 28. Kilotech
- ☐ 29. Kirk-Rudy, Inc.
- ☐ 30. Linton Company
- ☐ 31. Lockheed Martin PTI
- ☐ 32. Longford Equipment
- ☐ 33. Mail Advertising Supply
- ☐ 34. MailCoda, Inc.
- ☐ 35. Mailcrafters
- ☐ 36. Mailers Software
- ☐ 37. Mail-Gard Concepts
- ☐ 38. Mail Solutions
- ☐ 39. Mail-Well Envelope
- ☐ 40. Millennium Group
- ☐ 41. NATCO, Inc.
- ☐ 42. National Presort, Inc.
- ☐ 43. Neopost
- ☐ 44. New Media Tech.
- ☐ 45. Oce Printing Systems
- ☐ 46. Omation, div. OPEX
- ☐ 47. OPEX Corporation
- ☐ 48. Parcel Insurance Plan
- ☐ 49. Pitney Bowes (F350)
- ☐ 50. Pitney Bowes (Inserter)
- ☐ 51. Pitney Bowes Supplies
- ☐ 52. POSTech Plastic-Sort
- ☐ 53. Postmatic, Inc.
- ☐ 54. Printing Edge
- ☐ 55. PrintSoft Americas
- ☐ 56. Prism, Inc.
- ☐ 57. Profold, Inc.
- ☐ 58. PSI, Peripheral Sol.
- ☐ 59. RENA Systems
- ☐ 60. Signode, Inc.
- ☐ 61. SITMA, USA
- ☐ 62. Streamfeeder
- ☐ 63. Supply Chain Logic
- ☐ 64. Sure-Feed Engineering
- ☐ 65. Taneum Computers
- ☐ 66. Tension Envelope
- ☐ 67. Ultra Systems
- ☐ 68. USPS (Global)
- ☐ 69. USPS Priority Mail
- ☐ 70. Viking Metal Cabinets
- ☐ 71. Whittier Mailing Prod.
- ☐ 72. Worcester Envelope Co.

*To receive ALL available information on a product category, circle heading(s):*

Addressing/Barcode Printers
Bag/Tray Tagging Systems
Barcoding/Sorting Systems
Bursters/Cutters/Collators
Camera Monitoring Systems
Database/Postal Software
Delivery Services
Document Printing Systems
Document Software
Document Processing Systems
Document Tracking Systems Encoding Services/Systems
Envelopes/Mailers
Facilities Management Services
Folding Machines/Systems
Forms Processing Systems
Furniture Systems
Incoming Mail Sorters
Ink Jet Addressing/Accessories
Inserter Mailing Systems
Inserters (Low Volume)
Inserter Feeders/Accessories International Mail Services
Labelers/Labeling Supplies
Mail Carts & Accessories
Mail Center Supplies
Mail/Courier Bags
Mailing Products/Supplies
Mail Openers/Extractors
Paper Shredders
Postage Meters/Machines
Postage Machine Sealer
Printer Systems/Supplies
Remittance Processing Sys.
Roll Feed Equipment
Scales & Registers
Self Mailing Systems
Shipping Systems/Software
Stamp Affixers
Strapping/Bundling Systems
Systems Integration
Tabbing Systems/Supplies
Tracking Systems
Tray Processing Systems
Tying Systems
Wrapping/Polybag Systems

NAME _____

TITLE _____

COMPANY _____

STREET _____

CITY/STATE/ZIP _____

PHONE _____

☐ Check here for a One Year Subscription to MAIL ($36)

FIG. 2H
(Prior Art)

REPLY MAIL PROCESSING SYSTEM

CROSS REFERENCE TO RELATED APPLICATIONS

This application is a continuation-in-part of application Ser. No. 09/626,953, filed Jul. 27, 2000, now U.S. Pat. No. 6,459,953, which is hereby incorporated by reference.

FIELD OF THE INVENTION

This invention relates generally to mail handling systems, and more particularly, to a system and method for processing business reply mail in an efficient manner to obtain the information contained therein.

BACKGROUND OF THE INVENTION

Many companies and private concerns use business reply mail to solicit information and responses from the recipients of the business reply mail. As such, business reply mail has a wide variety of uses and is often customized depending upon the needs of the sender. A few examples of the uses for business reply mail are subscription solicitations, information request responses, proxy statement responses, remittance documents (invoices for payment due) and the like. Oftentimes, the business reply mail is provided to recipients as part of a direct mail campaign, an invoice or as a detachable insert in a periodical magazine or newsletter.

In a large business reply mail communication program, tens of thousands and even hundreds of thousands of pieces may be distributed. This means that eventually these business reply mail pieces must be received and processed. Typically, some smaller companies cannot afford or justify the cost of automated systems to collect and process the business reply mail because such systems may have long idle periods. Therefore, these companies utilize manual techniques for the handling of the business reply mail and the associated data entry. The result is a time consuming and costly process that is susceptible to human error. On the other hand, large companies expend considerable resources using dedicated equipment that has been customized for a particular business reply mail processing application. Although these systems work generally well, they are not flexible to accommodate the needs of different business reply mail processing applications and require manual pre-sorting of the business reply mail into batches of like kind prior to processing. This is particularly cumbersome and inefficient when it is desired that each business reply mail piece be processed the very same day that it is received.

Therefore, the large volume of business reply mail handled today has created the need for improved systems capable of processing large volumes of business reply mail to rapidly acquire the information that each reply mail piece contains and initiate appropriate follow up activity. Furthermore, there is a need for a flexible system that can accommodate the requirements of different business reply mail processing applications without undue costs and delays due to customization and setup.

SUMMARY OF THE INVENTION

The present invention provides a business reply mail processing system, a method of processing business reply mail and a data structure for use in processing business reply mail. Generally, this is accomplished by organizing information associated with different mail campaigns into respective job data sets and using the job data sets to process the business reply mail pieces.

In accordance with the present invention, there is provided a business reply mail processing system that includes a transport module, a scanner module and a control module in operative communication with the scanner module. The transport module feeds a business reply mail piece in a path of travel. In accordance with one embodiment of the present invention, the business reply mail piece includes a job ID code and field data. The scanner module is located adjacent to the path of travel for scanning the business reply mail piece to read the job ID code and the field data. The control module includes a mail campaign job database. The control module uses the job ID code, scanned from the business reply mail piece, to access processing data from the mail campaign job database corresponding to the job ID code and controls the scanner module using the processing data to read the field data from the business reply mail piece.

In accordance with another embodiment of the present invention, the business reply mail piece includes processing data and field data. The scanner module scans the business reply mail piece to read the processing data. The processing data is passed to the control module, which utilizes the processing data to control the scanner module to then read the field data from the business reply mail piece.

In accordance with the present invention, methods of operating the business reply mail processing system, a data structure (memory device) and a business reply mail piece are also provided.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIGS. 2A and 2B are an example of a first business reply mail piece (front and back, respectively) that exists in the prior art;

FIGS. 2C and 2D are an example of a second business reply mail piece (front and back, respectively) that exists in the prior art.

FIGS. 2E and 2F are an example of a third business reply mail piece (front and back, respectively) that exists in the prior art;

FIGS. 2G and 2H are an example of a fourth business reply mail piece (front and back, respectively) that exists in the prior art;

DETAILED DESCRIPTION OF THE PREFERRED EMBODIMENTS

Figure 1:
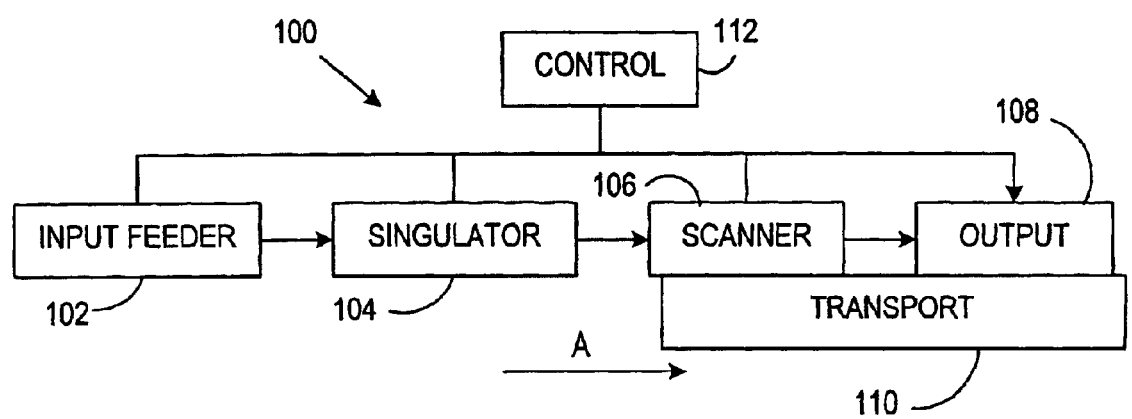
FIG. 1 is a simplified schematic representation of a business reply mail processing system in accordance with the present invention.
Figure 2A:
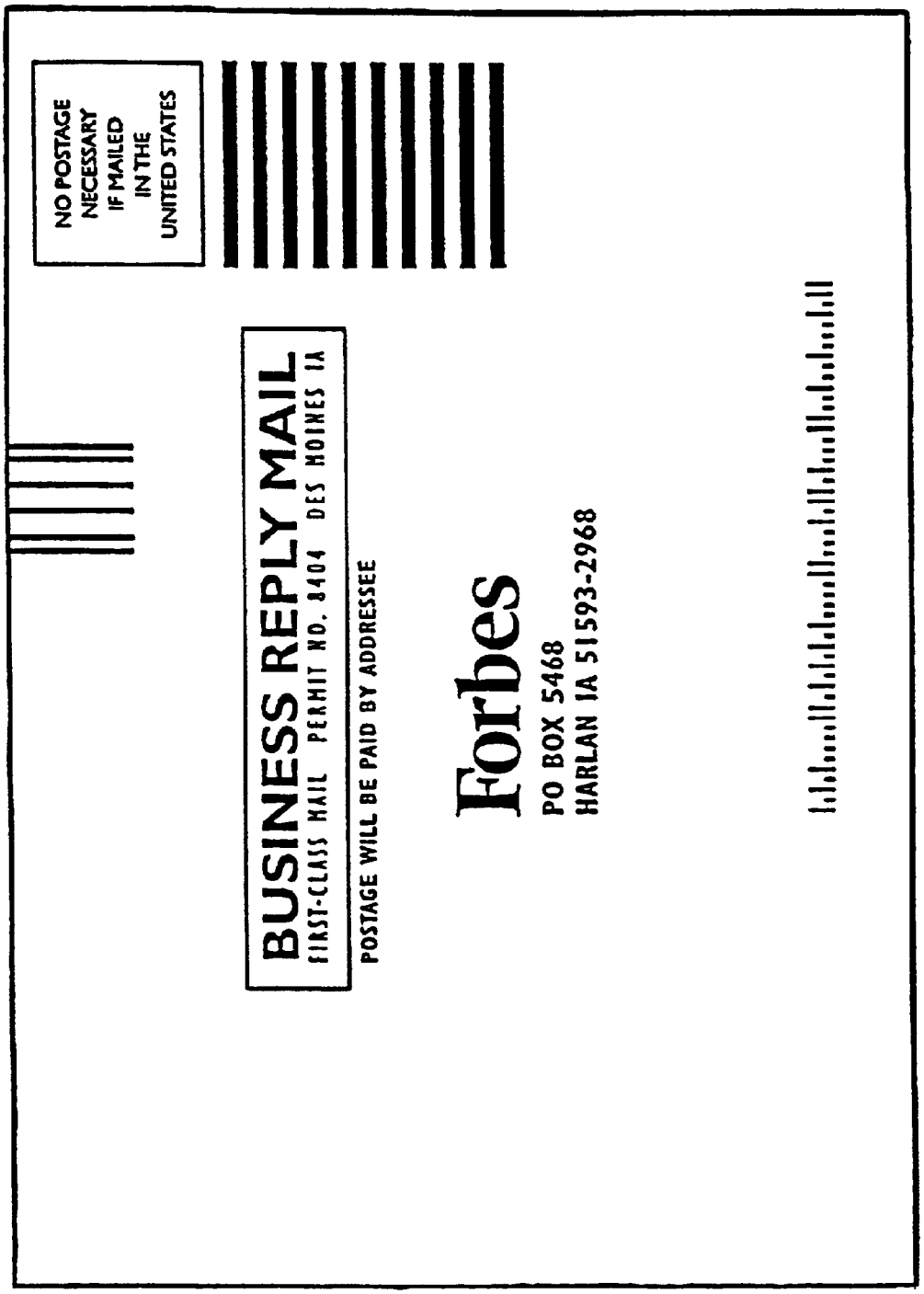
Figure 2C:
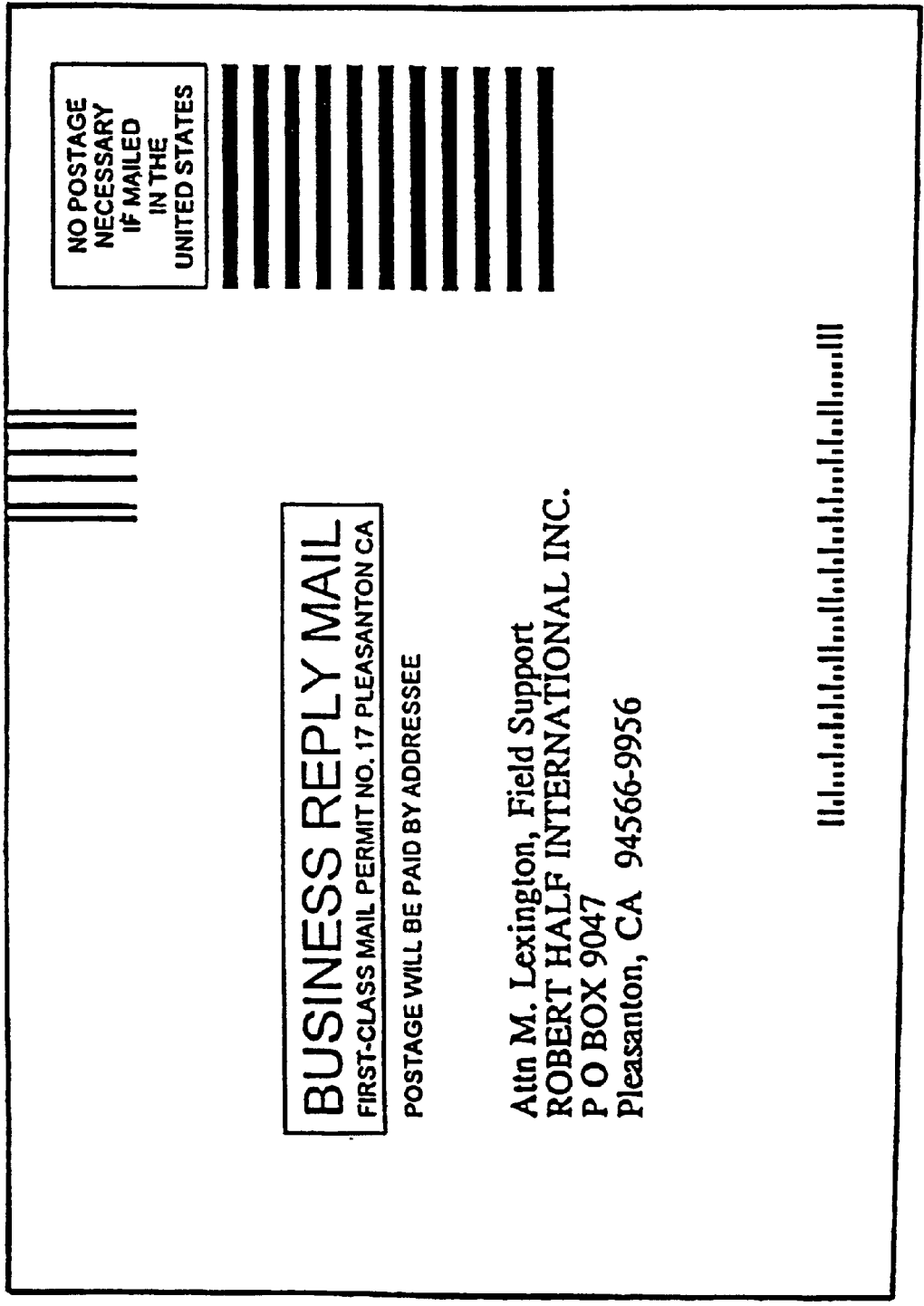
Figure 2E:
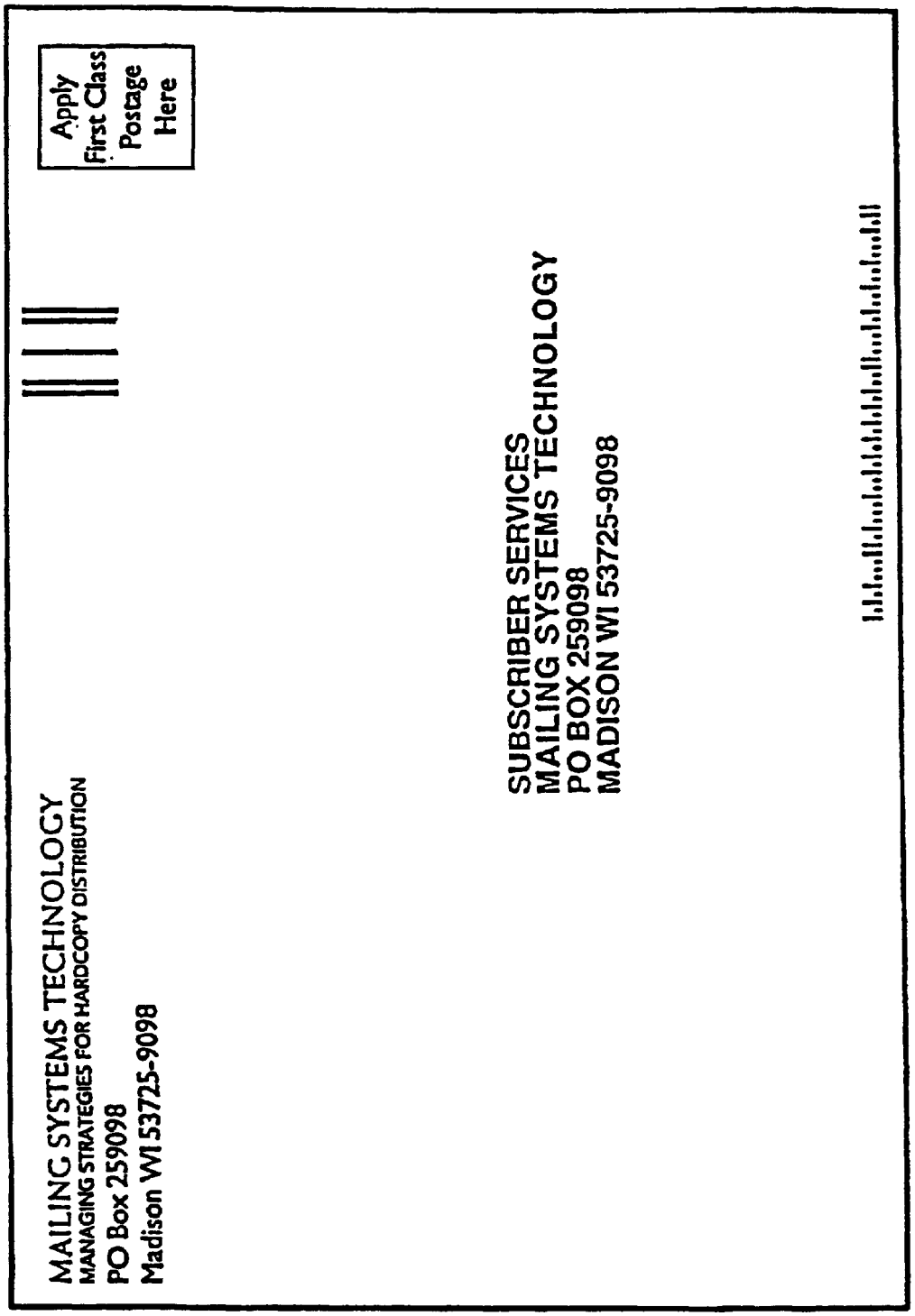
Figure 2F:
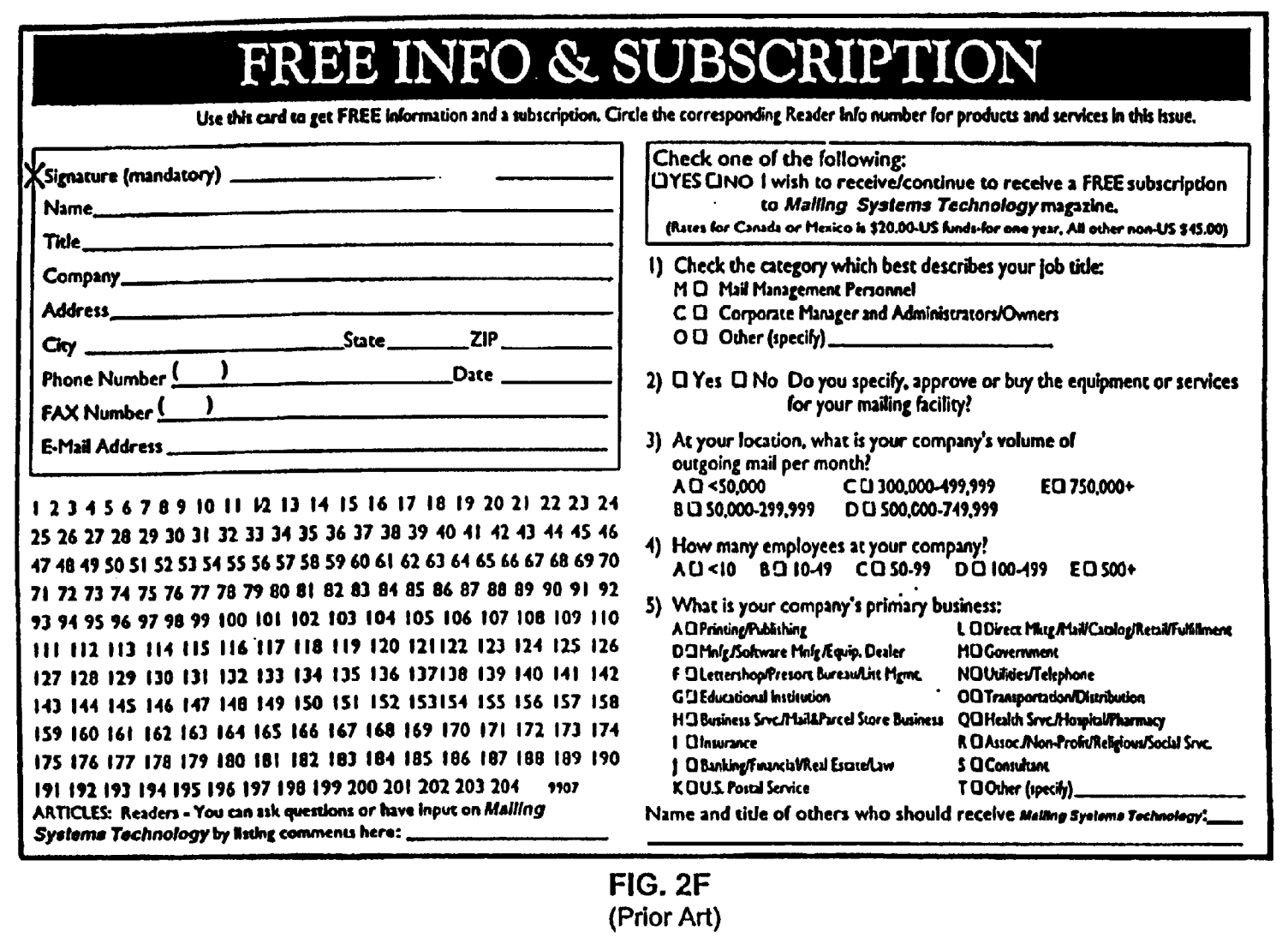
Figure 2G:
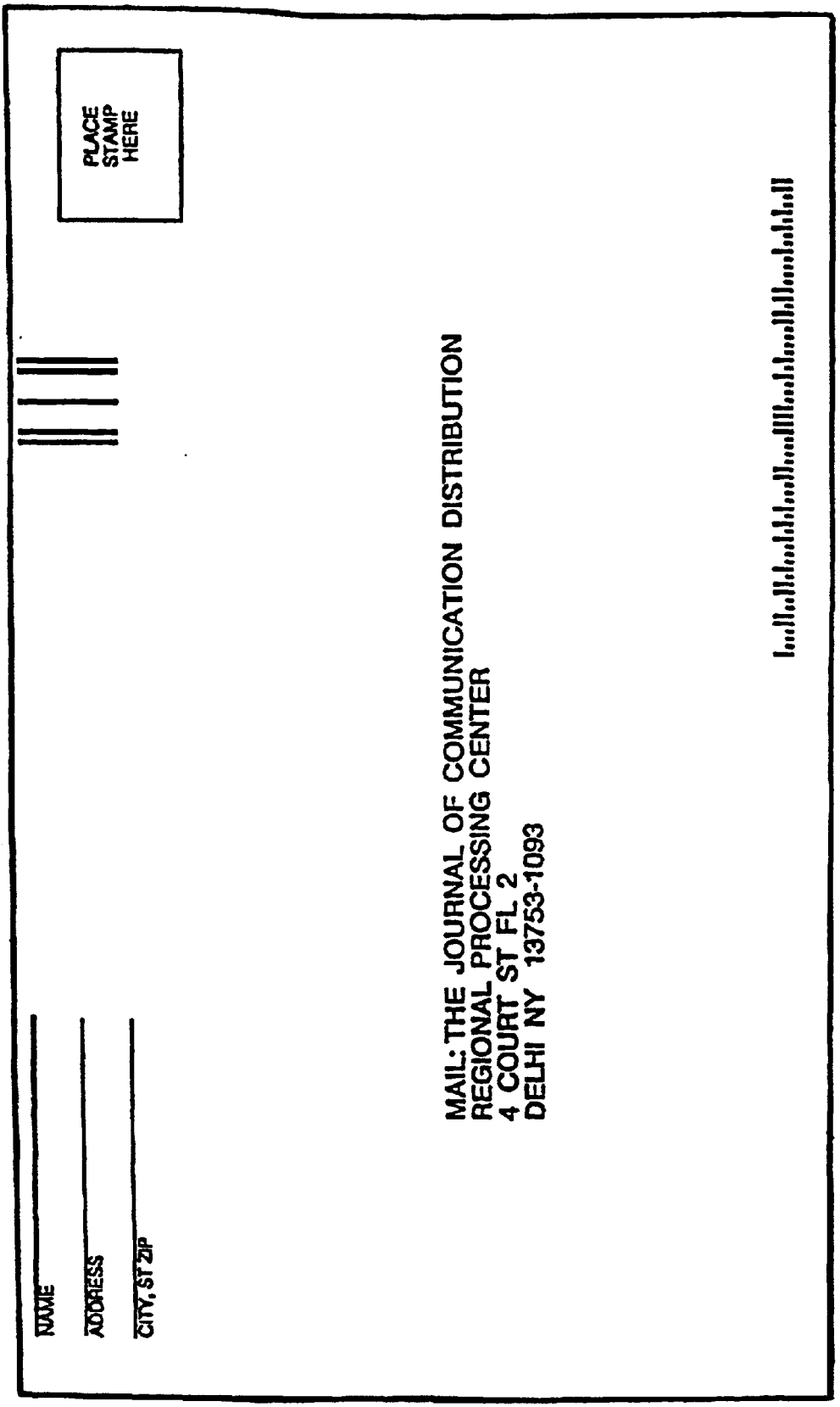

Referring to FIG. 1, a business reply mail processing system 100 in which the present invention may be incorporated is shown. The processing system 100 includes a plurality of modules that perform various functions on the mail pieces (not shown) as they are fed through the system 100 in a path of travel as indicated by arrow A. Referring to FIGS. 2A–2H, examples of various types of business reply mail pieces in the prior art are shown. Although FIGS. 2A–2H all show post card type business reply mail pieces, those skilled in the art will recognize that the business reply mail piece may also be an envelope along with its contents. Also, FIGS. 2A–2D show business reply mail pieces where postage has been pre-paid, while FIGS. 2E–2G show business reply mail pieces that require the recipient to pay for postage. As described above, the business reply mail pieces are generally distributed as enclosures or attachments to other outgoing mail pieces (not shown) generated by the mail campaign sender. Referring again to FIG. 1, the processing system 100 includes an input feeder module 102, a singulator module 104, a scanner module 106, an output module 108, a transport module 110 and a control module 112. Generally, the plurality of modules are under the control of the control module 112.

Bundles of mail pieces (not shown), such as business reply cards, post cards, and the like, are loaded by an operator into the processing system 100 at the input feeder module 102. The input feeder module 102 advances the mail pieces toward the singulator module 104 where the mail pieces are separated and fed one-by-one (one at a time) to the transport module 110. Preferably, the input feeder module 102 and the singulator module 104 are of a type that can handle mail pieces of mixed size, thickness and weight, such as the one described in U.S. Pat. No. 4,978,114, entitled REVERSE BELT SINGULATING APPARATUS or the one described in U.S. Pat. No. 6,276,679, entitled FLOATING IDLER PULLEY RETARD SYSTEM FOR MIXED MAIL SEPARATION, the disclosures of which are both specifically incorporated herein by reference. This capability is important because it is largely anticipated that the mail pieces received at a central location are part of different mail campaigns. Therefore, to avoid the time delay and cost associated with presorting the mail pieces, the ability to handle mixed mail is highly desirable.

Once singulated, the mail pieces are advanced along the path of travel through the remaining modules of the processing system 100 by the transport module 110. The scanner module 106 is positioned adjacent to the path of travel so that mail pieces may be scanned and/or imaged as they are fed downstream in the path of travel. Preferably, the scanner module 106 includes a scanner on each side of the path of travel so that: (i) both sides of the mail piece may be scanned, if necessary; and/or (ii) depending upon the orientation of the mail piece, information from the side of the mail piece requiring scanning may be scanned in the event that only one side of the mail piece requires scanning. Generally, any conventional scanner, whether based on laser, CCD or some other technology, may be employed, such as those provided by Symbol Technologies, Inc. of Long Island, N.Y.

Following scanning, the mail pieces are further fed by the transport module 110 to the output module 108. The output module 108 includes a plurality of output bins (not shown) for collecting the mail pieces that have been properly processed and an outsort bin for mail pieces that cannot be properly read via machine reading techniques. The plurality of output bins are provided so that like mail pieces may be collected together for ease of removal by the operator and for ease of separating the mail pieces of different mail campaigns. Generally, the output module 108 may be of any conventional design, such as the one described in U.S. Pat. No. 5,368,287, entitled INTELLIGENT TRAYER FOR INSERTER, the disclosure of which is specifically incorporated herein by reference.

As discussed above, the control module 112 serves to coordinate activities among the various modules of the processing system 100. Generally, the control module 112 provides for the smooth operation of the processing system 100 according to the introductory discussion provided above and the further detailed discussion provided below. Also, the control module 112 serves as an interface with the operator by providing messages to and receiving input from the operator. As a result, the control module preferably includes a display (CRT, LCD, or the like) (not shown) and an input device (keypad, keyboard, touch screen, mouse, or the like) (not shown). Therefore, those skilled in the art will recognize that the control module 112 may employ any suitable combination of computer hardware and software to facilitate the operation, storage, access and processing of information and various other computer based communications that are required as described above and in greater detail below.

Figure 3:
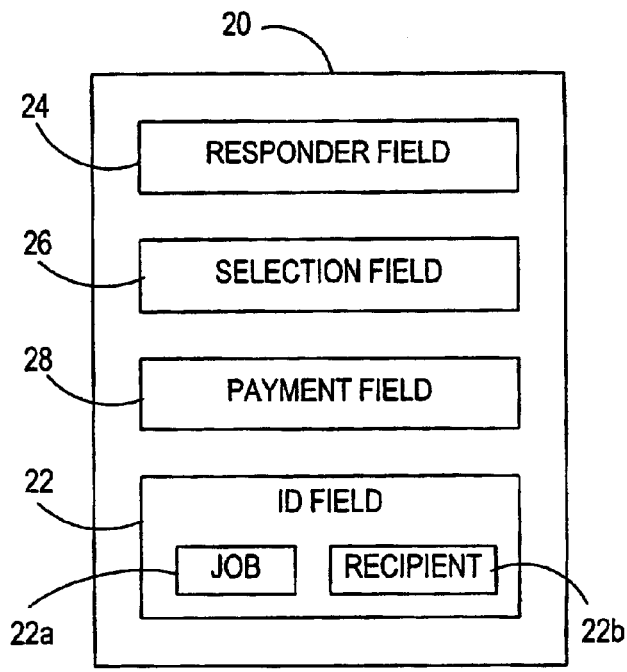
FIG. 3 is a simplified schematic representation of a business reply mail piece in accordance with an embodiment of the present invention.

Referring to FIG. 3, a simplified schematic representation of a business reply mail piece (BRMP) 20 in accordance with one embodiment of the present invention is shown. For the sake of brevity and clarity, it is assumed that only one side of the BRMP 20 contains data requiring scanning and this side is the one shown. For example, the other side (not shown) of the business reply mail piece 20 is preferably the one with the postal delivery address and postage payment information. The BRMP 20 includes fields of data, such as, for example, an identification (ID) field 22, a responder identification field 24, a responder selection field 26 and a payment field 28. Generally, the ID field 22 assists the processing system 100 in recognizing the different mail campaigns that may exist and provides the key for how the scanning and/or imaging of the BRMP 20 is to occur and what post processing activities should be conducted. As the scanner module 106 encounters each BRMP 20, the scanner module 106 searches for the ID field 22 first. In one embodiment of the present invention, the ID field 22 includes a job ID code 22a and a recipient ID code 22b. The job ID code 22a is a unique identifier that may be made up of any suitable alphanumeric string or any other conventional symbology sufficient to distinguish one mail campaign from another mail campaign. Those skilled in the art will recognize that the job ID code 22a may be printed/placed on the BRMP 20 as traditional characters, in bar code format, 2-D bar code format, or any other conventional format that facilitates machine readability. As an additional option, the recipient ID code 22b may be utilized and is also a unique identifier (alphanumeric or otherwise) that distinguishes each recipient among the plurality of recipients of the mail campaign.

The responder identification field 24, the responder selection field 26 and the payment field 28 are previously designated areas of the BRMP 20 established by the mail campaign sender that are filled out by the responder. The responder identification field 24 allows the responder to identify him or herself by name, address and any other pertinent information to the mail campaign sender. It is important to note that the recipient ID code 22b may not match the responder because one individual may receive the BRMP 20 while a different individual may utilize it. The responder selection field 26 includes information and/or instructions provided by the responder that is particular to each mail campaign. The payment field 28 may or may not be included depending upon the subject matter and the requirements of the BRMP 20. The payment field 28 may include credit card information, a request for invoice or other billing/payment options. Those skilled in the art will recognize that due to the wide variety of business reply mail, the responder identification field 24, the responder selection field 26 and the payment field 28 may vary greatly from mail campaign to mail campaign. Also, the organization of the various fields 22, 24, 26 and 28 on the BRMP 20 has no bearing on the present invention.

Figure 4:
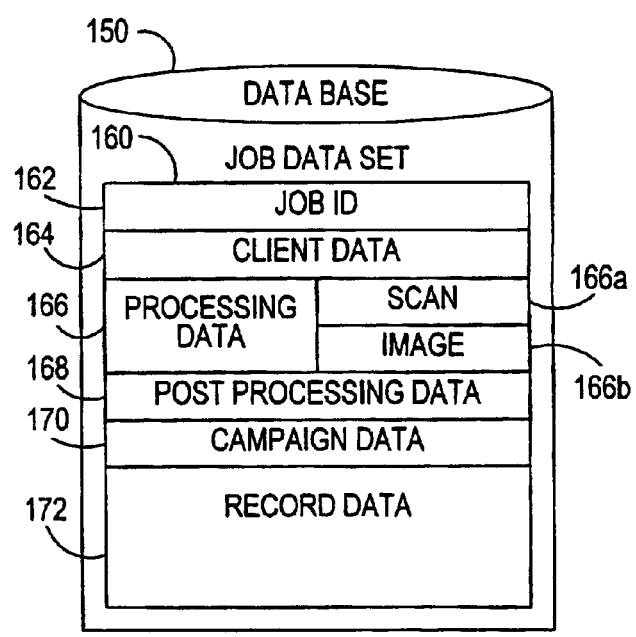
FIG. 4 is a simplified schematic representation of a database structure including information used to process business reply mail pieces and to initiate other post processing functions in accordance with an embodiment of the present invention.

Referring to FIG. 4 in view of FIGS. 1 and 3, a mail campaign job database 150, including a job data set 160, located within the control module 112 is shown. The database 150 may be operatively connected to the computer processing portion of the control module 112 in any conventional manner, such as, for example, by direct bus communication, local area network, wide area network, or the like. The database 150 may be implemented in any conventional computer storage technology comprising a suitable combination of computer memory devices and database management tools software. The database 150 includes a plurality of job data sets 160 that contain information and instructions pertaining to each mail campaign, respectively.

For the sake of clarity, the data structure associated with one job data set 160 has been shown. The job data set 160 includes a job ID code 162, client data 164, mail piece processing data 166, post processing data 168, mail campaign data 170 and record data 172. The job ID code 162 corresponds to the job ID code 22a located on the BRMP 20. In this manner, the processing system 100 may associate each BRMP 20 with a particular job data set 160. The client data 164 is an optional feature that includes contact information about the individual or organization responsible for the mail campaign identified by the job ID code 162. This may be most beneficial to those who operate the processing system 100 on a contract basis for a variety of different mail campaign senders. However, even large organizations that have captive clients may utilize this feature as well to identify different mail campaigns of the same sender. The processing data 166 includes scan instruction data 166a and image capture instruction data 166b. The scan instruction data 166a provides indications to the control module 112 where the responder field 24, the selection field 26 and the payment field 28 are located on the BRMP 20. Thus, the processing data 166 is utilized by the control module 112 to direct the scanner module 106 and to process the field data on the BRMP 20, such as, for example, where to scan, what to scan, how (OCR, bar code, etc.) to scan, how to interpret the data read from the various field data 24, 26 and 28 from the business reply mail piece 20 and whether or not recipient ID codes 22b are present. The image capture instruction data 166b provides indications whether or not a graphical image of the BRMP 20 should be obtained, stored and in what format Opeg, bit map, pdf, or the like). The post processing instruction data 168 provides indications of all the possible output activities, beyond the scanning and capture of information from the BRMP 20 that might possibly be taken based upon the field data 24, 26 and 28 supplied by each responder. As examples, the post processing data 168 may specify any of the following: customer care follow up activities, dispatch of requested materials to the responder; billing of the responder's account, generation of reports for use by the mail campaign sender, and the like. Those skilled in the art will recognize that due to the wide range of business reply mail, the post processing options are quite varied and their exact makeup does not constitute part of the present invention. The campaign data 170 are optional features that may include information relating to the specific details of the mail campaign, such as, for example, the number of BRMPs 20 that were sent. The record data 172 includes the information collected from the BRMPs 20. Preferably, the information associated with each BRMP 20 is stored in a respective record under the recipient ID code 22b. In the alternative, if the recipient ID code 22b and the responder field data 24 do not match, then the information associated with these BRMPs 20 is stored in a respective record under an indication of the responder field data 24.

Figure 5:
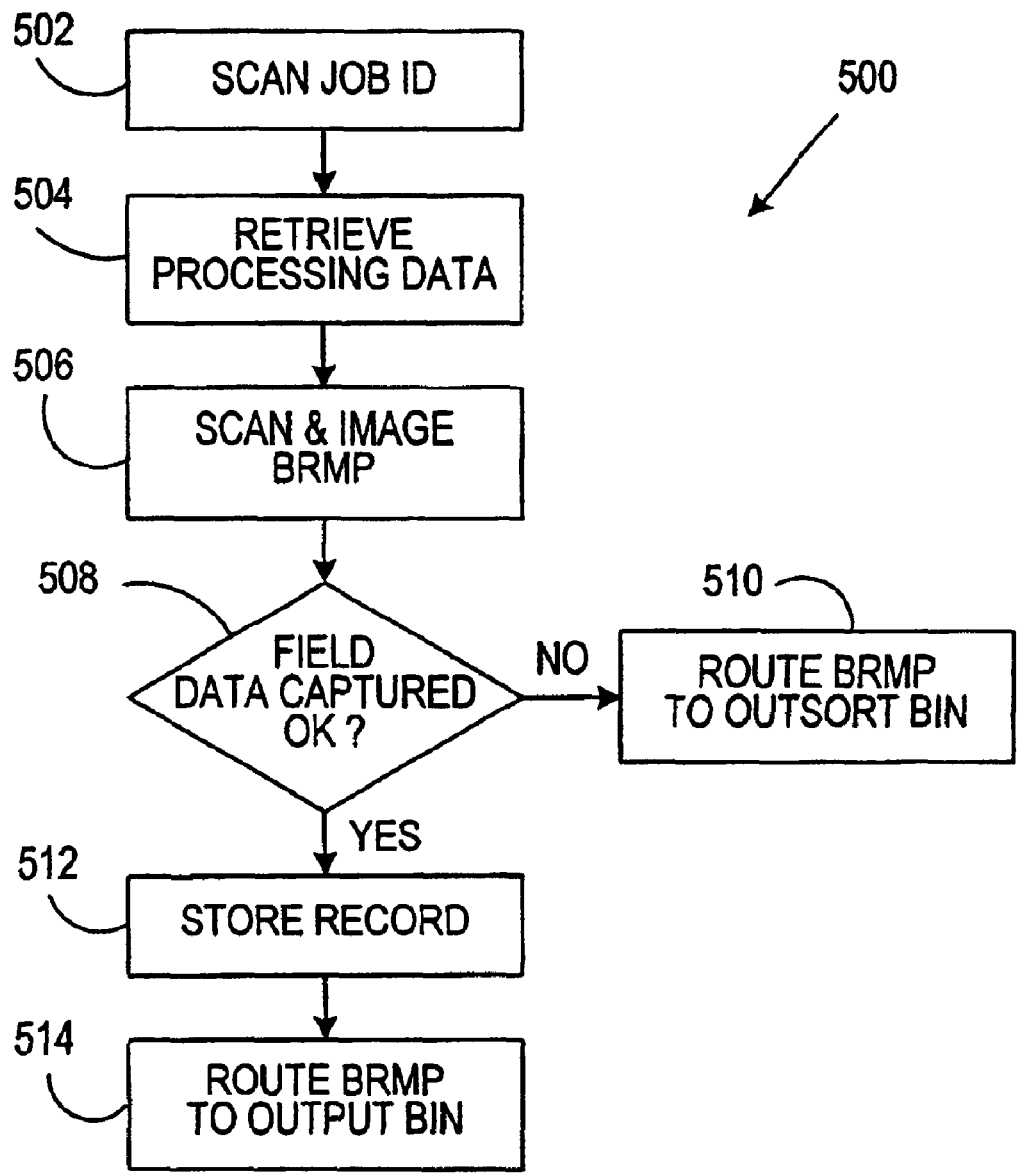
FIG. 5 is a schematic flow diagram of a data capture routine for processing of a business reply mail piece in accordance with an embodiment of the present invention.

With the structure of the business reply mail piece processing system 100 described as above, the operational characteristics will now be described. Referring primarily to FIG. 5 while referencing the structure of FIGS. 1, 3 and 4, a data capture routine 500 describing the operation of the processing system 100 is shown. Generally, the routine 500 commences when the scanner module 106 encounters a BRMP 20. Additionally, since it is anticipated that the business reply mail stream flowing through the processing system 100 will contain mail pieces 20 corresponding to different mail campaigns, the routine 500 will largely be run for each individual BRMP 20 without much variation. At 502, the scanner module 106 locates and scans the job ID code 22a from the BRMP 20. Here again, because of the mixed mail stream, it is easier to use the scanner module 106 to locate the job ID code 22a than to standardize the design of the BRMPs 20 and present them properly "faced" to the scanner module 106 for reading. However, those skilled in the art will recognize that alternative techniques exist. Next, at 504, once the job ID code 22a has been obtained, the control module 112 accesses the job data set 160 corresponding to the job ID code 22a and retrieves the processing data 166. Next, at 506, the control module 112 uses the processing data 166 to scan and image the BRMP 20 accordingly using optical character recognition (OCR) techniques or the like depending upon the form of data entry solicited from the responder. Next, at 508, a determination is made whether data obtained from the responder identification field 24, the responder selection field 26 and the payment field 28 has been reliably captured. If the answer is no, then at 510, the BRMP 20 is routed to the outsort bin (not shown) and no further processing occurs at this time. As an option, a human may read this out sorted BRMP 20 at a later time (or even real time at a specially designed operator station) and enter its data manually into the processing system 100. On the other hand, if the answer is yes, then at 512 the data from the BRMP 20 is stored in a record contained within the job data set 160. As discussed above, the data is preferably associated with the responder field 24 information or the recipient ID code 22b, whichever best identifies the individual that filled out the BRMP 20. Next, at 514, as an additional optional feature, the BRMP 20 is routed to one of the plurality of the output bins (not shown) that has been designated to receive the BRMPs 20 associated with the scanned job ID code 22a. In this way, if the mail campaign sender desires that the BRMPs 20 be returned, the operator may simply forward the contents of the designated output bin without any manual sorting.

Figure 6:
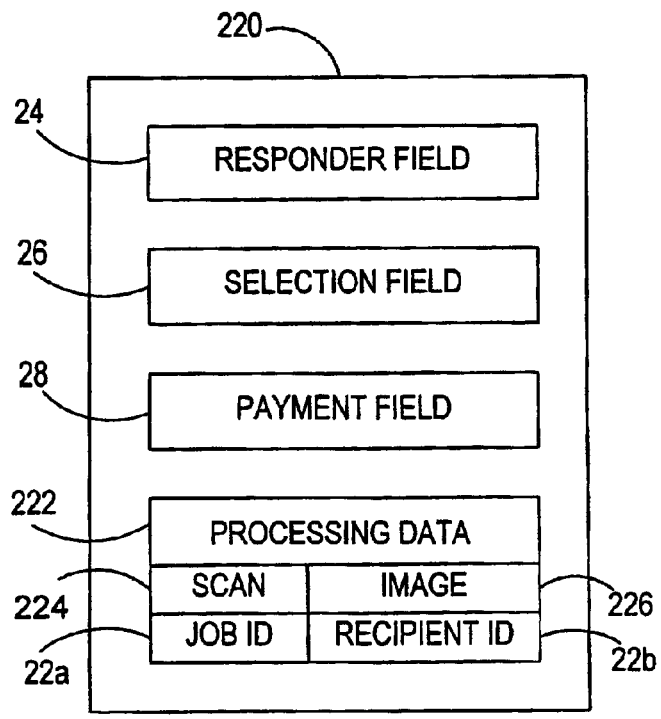
FIG. 6 is a simplified schematic representation of a business reply mail piece in accordance with another embodiment of the present invention.

Referring now to FIG. 6, a simplified schematic representation of a business reply mail piece (BRMP) 220 in accordance with another embodiment of the present invention is shown. For the sake of brevity and clarity, it is assumed that only one side of the BRMP 220 contains data requiring scanning and this side is the one shown. For example, the other side (not shown) of the business reply mail piece 220 is preferably the one with the postal delivery address and postage payment information. The BRMP 220 includes fields of data, such as, for example, a processing data field 222, a responder identification field 24, a responder selection field 26 and a payment field 28. Generally, the processing data field 222 assists the processing system 100 in recognizing the different mail campaigns that may exist and provides the key for how the scanning and/or imaging of the BRMP 220 is to occur and what post processing activities should be conducted. As the scanner module 106 encounters each BRMP 220, the scanner module 106 searches for the processing data field 222 first.

The processing data field 222 includes scan instruction data 224 and image capture instruction data 226. The scan instruction data 224 provides indications to the control module 112 where the responder field 24, the selection field 26 and the payment field 28 are located on the BRMP 220. Thus, the scan instruction data 224 in the processing data field 222 is utilized by the control module 112 to direct the scanner module 106 and to process the field data on the BRMP 220, such as, for example, where to scan, what to scan, how (OCR, bar code, etc.) to scan, how to interpret the data read from the various field data 24, 26 and 28 from the business reply mail piece 220 and whether or not recipient ID codes 22b are present. The image capture instruction data 226 provides indications whether or not a graphical image of the BRMP 220 should be obtained, stored and in what format (jpeg, bit map, pdf, or the like).

Preferably, the processing data field 222 includes a job ID code 22a and a recipient ID code 22b. The job ID code 22a is a unique identifier that may be made up of any suitable alphanumeric string or any other conventional symbology sufficient to distinguish one mail campaign from another mail campaign. Those skilled in the art will recognize that the processing data field 222 may be printed/placed on the BRMP 220 as traditional characters, in bar code format, 2-D bar code format, or any other conventional format that facilitates machine readability. As an additional option, the recipient ID code 22b may be utilized and is also a unique identifier (alphanumeric or otherwise) that distinguishes each recipient among the plurality of recipients of the mail campaign.

The responder identification field 24, the responder selection field 26 and the payment field 28 are previously designated areas of the BRMP 220 established by the mail campaign sender that contain field data, i.e., they are filled out by the responder. The responder identification field 24 allows the responder to identify him or herself by name, address and any other pertinent information to the mail campaign sender. It is important to note that the recipient ID code 22b may not match the responder because one individual may receive the BRMP 220 while a different individual may utilize it. The responder selection field 26 includes information and/or instructions provided by the responder that is particular to each mail campaign. The payment field 28 may or may not be included depending upon the subject matter and the requirements of the BRMP 220. The payment field 28 may include credit card information, a request for invoice or other billing/payment options. Those skilled in the art will recognize that due to the wide variety of business reply mail, the responder identification field 24, the responder selection field 26 and the payment field 28 may vary greatly from mail campaign to mail campaign. Also, the organization of the various fields 222, 24, 26 and 28 on the BRMP 220 has no bearing on the present invention.

Figure 7:
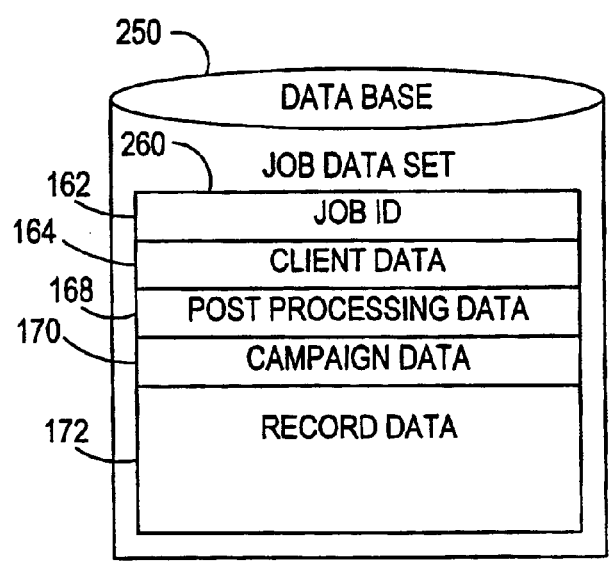
FIG. 7 is a simplified schematic representation of a database structure including information used to process business reply mail pieces and to initiate other post processing functions in accordance with another embodiment of the present invention.

Referring to FIG. 7 in view of FIGS. 1 and 6, a mail campaign job database 250, including a job data set 260, located within the control module 112 is shown. The database 250 may be operatively connected to the computer processing portion of the control module 112 in any conventional manner, such as, for example, by direct bus communication, local area network, wide area network, or the like. The database 250 may be implemented in any conventional computer storage technology comprising a suitable combination of computer memory devices and database management tools software. The database 250 includes a plurality of job data sets 260 that contain information and instructions pertaining to each mail campaign, respectively. It should be understood, of course, that database 150 and database 250 need not be separate databases, but instead could be only a single database that stores different types of job data sets 160, 260.

For the sake of clarity, the data structure associated with one job data set 260 has been shown. The job data set 260 includes a job ID code 162, client data 164, post processing data 168, mail campaign data 170 and record data 172. The job ID code 162 corresponds to the job ID code 22a located in the processing data field 222 on the BRMP 220. In this manner, the processing system 100 may associate each BRMP 220 with a particular job data set 260. The client data 164 is an optional feature that includes contact information about the individual or organization responsible for the mail campaign identified by the job ID code 162. This may be most beneficial to those who operate the processing system 100 on a contract basis for a variety of different mail campaign senders. However, even large organizations that have captive clients may utilize this feature as well to identify different mail campaigns of the same sender. The post processing instruction data 168 provides indications of all the possible output activities that might possibly be taken based upon the field data 24, 26 and 28 supplied by each responder. As examples, the post processing data 168 may specify any of the following: customer care follow up activities, dispatch of requested materials to the responder;

billing of the responder's account, generation of reports for use by the mail campaign sender, and the like. Those skilled in the art will recognize that due to the wide range of business reply mail, the post processing options are quite varied and their exact makeup does not constitute part of the present invention. The campaign data 170 are optional features that may include information relating to the specific details of the mail campaign, such as, for example, the number of BRMPs 220 that were sent. The record data 172 includes the information collected from the BRMPs 220. Preferably, the information associated with each BRMP 220 is stored in a respective record under the recipient ID code 22b. In the alternative, if the recipient ID code 22b and the responder field data 24 do not match, then the information associated with these BRMPs 220 is stored in a respective record under an indication of the responder field data 24.

Figure 8:
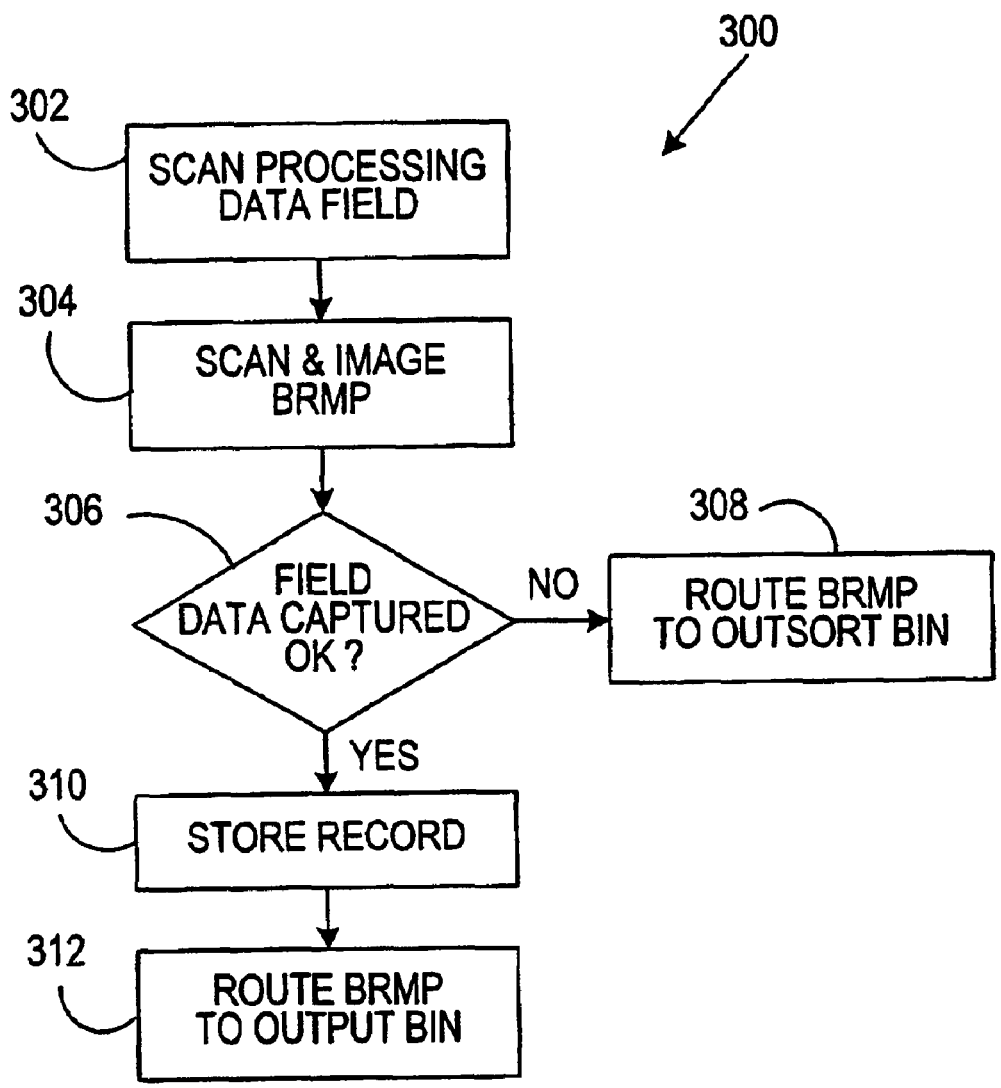
FIG. 8 is a schematic flow diagram of a data capture routine for processing of a business reply mail piece in accordance with another embodiment of the present invention.

The operational characteristics of the system 100 with respect to the BRMP 220 illustrated in FIG. 6 and database 250 illustrated in FIG. 7 will now be described with reference to FIG. 8, where a data capture routine 300 describing the operation of the processing system 100 is shown. Generally, the routine 300 commences when the scanner module 106 encounters a BRMP 220. Additionally, since it is anticipated that the business reply mail stream flowing through the processing system 100 will contain mail pieces 220 corresponding to different mail campaigns, the routine 300 will largely be run for each individual BRMP 220 without much variation. At 302, the scanner module 106 locates and scans the processing data field 222 from the BRMP 220. Here again, because of the mixed mail stream, it is easier to use the scanner module 106 to locate the processing data field 222 than to standardize the design of the BRMPs 220 and present them properly "faced" to the scanner module 106 for reading. However, those skilled in the art will recognize that alternative techniques exist. Next, at 304, once the data, i.e., the scan instruction data 224 and image capture instruction data 226, contained within the processing data field 222 has been obtained, the control module 112 uses the scan instruction data 224 and the image capture data 226 to scan and, if instructed, image the BRMP 220 accordingly using optical character recognition (OCR) techniques or the like depending upon the form of data entry solicited from the responder. Next, at 306, a determination is made whether data obtained from the responder identification field 24, the responder selection field 26 and the payment field 28 has been reliably captured. If the answer is no, then at 308, the BRMP 220 is routed to the outsort bin (not shown) and no further processing occurs at this time. As an option, a human may read this out sorted BRMP 220 at a later time (or even real time at a specially designed operator station) and enter its data manually into the processing system 100.

If in step 306 it is determined that the data has been reliably captured, then at 310 the data from the BRMP 220 is stored in a record contained within the job data set 260. As discussed above, the data is preferably associated with the responder field 24 information or the recipient ID code 22b, whichever best identifies the individual that filled out the BRMP 220. Next, at 312, as an additional optional feature, the BRMP 220 is routed to one of the plurality of the output bins (not shown) that has been designated to receive the BRMPs 220 associated with the scanned job ID code 22a. In this way, if the mail campaign sender desires that the BRMPs 220 be returned, the operator may simply forward the contents of the designated output bin without any manual sorting.

It should be understood, of course, that system 100 need not be set to perform processing of only one of BRMP 20 and BRMP 220. For example, both types of BRMPs 20 and 220 could be input to the system 100. Upon scanning and identifying the ID field 22 of a BRMP 20, the system 100 will enter the processing mode as described with respect to FIG. 5. Alternatively, upon scanning and identifying the processing data field 222 of BRMP 220, the system 100 will enter the processing mode as described with respect to FIG. 8. Thus, system 100 can identify the type of BRMP, i.e., either BRMP 20 or BRMP 220, and perform the processing accordingly without any pre-sorting of the different types of BRMPs.

Figure 9:
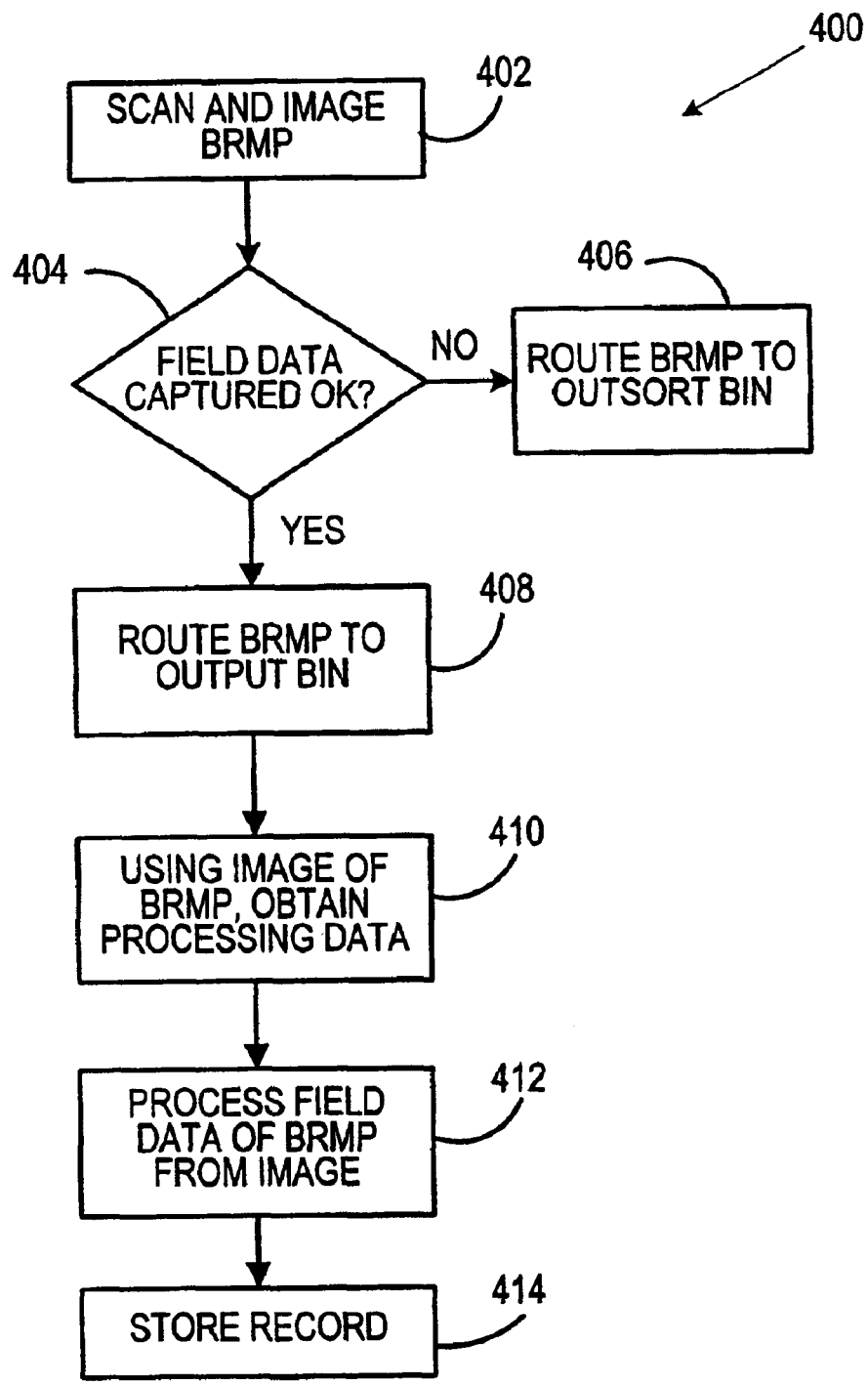
FIG. 9 is a schematic flow diagram of a data capture routine for processing of a business reply mail piece in accordance with another embodiment of the present invention.

Referring now to FIG. 9, a data capture routine 400 for processing of a business reply mail piece in accordance with another embodiment of the present invention is illustrated. In this embodiment, an image of the BRMP 20, 220 is obtained, and the reading and processing of the data is performed utilizing the image of the BRMP 20, 220. Generally, the routine 400 commences when the scanner module 106 encounters a BRMP 20, 220. At 402, the scanner module 106 scans the BRMP 20, 220 and an image of the BRMP 20, 220 is formed. Next, at 404, a determination is made as to whether the image has been reliably captured. Such determination can be performed, for example, based on the readability of the image being above some predetermined threshold. If the answer is no, then at 406, the BRMP 20, 220 is routed to the outsort bin (not shown) and no further processing occurs at this time. As an option, a human may read this out sorted BRMP 20, 220 at a later time (or even real time at a specially designed operator station) and enter its data manually into the processing system 100.

If it is determined that the image has been reliably captured in step 404, then in step 408 the BRMP 20, 220 is routed to an output bin (not shown). In step 410, the processing data for the BRMP 20, 220 is obtained using the image of the BRMP 20, 220. Thus, for a BRMP 20, the job ID code 22a is obtained from the image, the control module 112 accesses the job data set 160 corresponding to the job ID code 22a from the database 150, and the processing data 166 is retrieved. For a BRMP 220, the processing data field 222 is obtained from the image. In step 412, using the processing data obtained in step 410, the field data of the BRMP 20, 220 is processed using the image of the BRMP 20, 220. In step 414, the data from the image of the BRMP 20, 220 is stored in a record contained within the job data set 160, 260, respectively. Thus, according to the data processing routine 400, the BRMP 20, 220 can be quickly scanned, and the processing and interpretation of the field data can be performed utilizing the image of the BRMP 20, 220. This could further increase the throughput of the system 100, since all processing of the data is performed utilizing the image of the BRMP 20, 220, thereby reducing the time required for the BRMP 20, 220 to be on the transport 110 for scanning by scanner 106.

Figure 10:
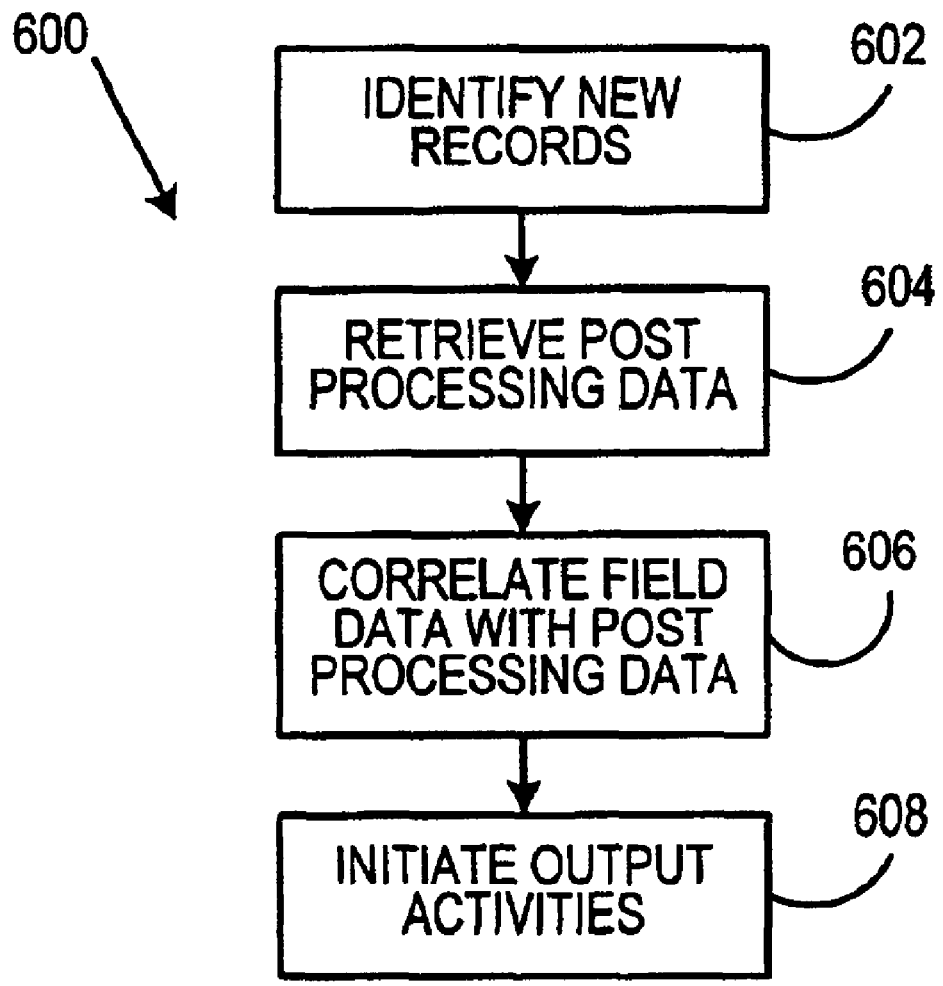
FIG. 10 is a schematic flow diagram of a post processing routine for initiating tasks beyond capturing of data contained on the business reply mail pieces in accordance with the present invention.

Referring now to FIG. 10, a post processing routine 600 describing further operation of the processing system 100 for initiating tasks beyond the capturing of data contained on the BRMPs 20 or 220 is illustrated. Generally, in the most preferred embodiment, it is anticipated that the post processing routine 600 will be run in response to some predetermined periodic event, such as, for example, the conclusion of processing of the BRMPs 20, 220 input to the system 100; the end of the day; after a given number of BRMPs 20, 220 have been processed; twice per day; or at some other convenient occasion. However, those skilled in the art will recognize that without much difficulty or variation, the post processing routine 600 may be executed real time following execution of the data capture routine 500 for each of the BRMPs 20 or data capture routine 300 for each of the BRMPs 220. At 602, the control module 112 identifies the new records contained within the database 150 and/or database 250 that have been updated since the previous post processing cycle was completed. Thus, each of the job data sets 160, 260 is screened to look for new records in their respective record data 172. For the sake of clarity, the remaining discussion will focus on the post processing associated with one of the job data sets 160, 260 and one new record. However, those skilled in the art will recognize that this same approach is duplicated for each of new records in the one job data set 160, 260 and also for each of the job data sets 160, 260 containing new records. Next, at 604, the post processing data 168 is retrieved. Generally, the post processing data 168 includes instructions for all the possible output activities, beyond the scanning and capture of information from the BRMP 20 or BRMP 220, that might possibly be taken based upon the field data 24, 26 and 28 supplied by the responder. Next, at 606, the field data 24, 26 and 28 is correlated with the post processing data 168 to determine which ones, if any, of the possible output activities have been triggered. Next, at 608, the control module 112 initiates the triggered ones of the possible output activities. For example, this may include commencing billing of the responder, dispatching an instruction to provide goods and/or services to the responder, updating the responder's contact information, and the like.

Based on the above description and the associated drawings, it should now be apparent that the present invention improves many aspects of the processing of business reply mail by facilitating the handling of intermixed mail pieces and the organization of scanned information.

Many features of the above embodiments represent design choices selected to best exploit the inventive concepts as implemented in a particular business reply mail processing environment as pertaining to traditional response card type business reply mail. However, those skilled in the art will recognize that various modifications and adaptations can be made without departing from the spirit of the present invention. For example, if it is desired to store an image of the business reply mail piece 20, 220 and destroy/recycle the business reply mail piece 20, 220, then it may also be desirable to authenticate the image. Thus, the image may be secured by employing a suitable encryption technique. A digital signature, originating from a certificate authority such as Verisign Inc., of the image may be stored along with the image so that a high degree of confidence that the image has not been altered is achieved.

As another example, the report generation capabilities of the processing system 100 may be expanded. For each job ID code 162, a report may be automatically prepared following conclusion of the post processing activities indicating various information about the status of the mail campaign, such as, for example, the number of business reply mail pieces 20, 220 that have been processed since the last reporting period, the total number of business reply mail pieces 20, 220 that have been processed, the types and distribution of output activities that have been taken, and the like.

As yet another example, if the business reply mail piece 20, 220 includes a recipient ID code 22b, then further activities are possible. The campaign data 170 may be updated to indicate that this recipient's business reply mail piece 20, 220 has been received. Also, the record associated with this recipient can be updated if the responder field data 24 indicates a new address or other updated information.

It is also possible to integrate input from other response formats into the processing system 100. Thus, the responder may be given a variety of ways in which to communicate, such as, for example, automated voice system, e-mail, fax, and the like. These response formats may be established so that they are also handled by the processing system 100 so that all modes of communication are integrated into a common processing system 100. The benefits are that the responder may select a preferred format for the business reply message (mail, phone, e-mail, fax, etc.). This may improve response rates.

As yet still another example, those skilled in the art will recognize that with only minor modifications, the processing system 100 may be adapted to be operated by the postal authority. In this manner, the BRMPs 20, 220 are processed at various receiving postal facilities around the country and the BRMPs 20, 220 are not even delivered. This saves the postal authority the expense of having to ship all of the BRMPs 20, 220 associated with each of the various mail campaigns to their respective delivery addresses. Also, the mail campaign senders receive the information more quickly because the BRMPs 20, 220 are processed upon deposit with the postal authority instead of having to wait until they are received at the delivery address.

Therefore, the inventive concept in its broader aspects is not limited to the specific details of the preferred embodiments described above, but is defined by the appended claims and their equivalents.

What is claimed is:

1. A business reply mail processing system comprising:
   a transport module for feeding a business reply mail piece returned by a responder, the business reply mail piece having a first side including address information and a second side including control data and field data thereon, the field data including information provided by the responder, the control data including identification information for the business reply mail piece and instructions for scanning the field data;
   a scanner module associated with the transport module to read the control data on the business reply mail piece; and
   a control module in operative communication with the scanner module, the control module using the identification information to identify the business reply mail piece as belonging to a specific mailing campaign and using the instructions for scanning the field data to control the scanner module to read at least a portion of the field data from the business reply mail piece.

2. The business reply mail processing system of claim 1, wherein the control data includes processing data, the processing data including instructions for processing the field data read from the business reply mail piece.

3. The business reply mail processing system of claim 1, wherein the control data further includes instructions for imaging the business reply mail piece.

4. A business reply mail processing system comprising:
   a transport module for feeding a business reply mail piece, the business reply mail piece including control data and field data thereon;
   a scanner module associated with the transport module to read the control data on the business reply mail piece;
   a control module in operative communication with the scanner module, the control module controlling the scanner module to read at least a portion of the field data from the business reply mail piece based on the control data; and
   a database coupled to the control module,
   wherein the control data includes a job identification code, the control module using the job identification code to access post processing data from the database corresponding to the job identification code, the post processing data including indications of possible output activities.

5. The business reply mail processing system of claim 4, further comprising:

a plurality of output bins located downstream in a path of travel from the scanner module, wherein the control module directs the business reply mail piece to a particular one of the plurality of output bins based on the job identification code.

6. A business reply mail processing system comprising:

a transport module for feeding a business reply mail piece, the business reply mail piece including control data and field data thereon;

a scanner module associated with the transport module to read the control data on the business reply mail piece;

a control module in operative communication with the scanner module, the control module controlling the scanner module to read at least a portion of the field data from the business reply mail piece based on the control data; and a database coupled to the control module, wherein the control data further includes a recipient identification code, the scanner module reads the recipient identification code, and the control module updates the database to reflect that the business reply mail piece corresponding to a particular recipient has been received.

7. A business reply mail processing system comprising:

a transport module for feeding a business reply mail piece, the business reply mail piece including control data and field data thereon;

a scanner module associated with the transport module to read the control data on the business reply mail piece;

a control module in operative communication with the scanner module, the control module controlling the scanner module to read at least a portion of the field data from the business reply mail piece based on the control data; and a database coupled to the control module, wherein the control data includes a job identification code, the control module using the job identification code to access processing data from the database corresponding to the job identification code, the processing data including instructions for reading the at least a portion of the field data from the business reply mail piece.

8. A business reply mail processing system comprising:

a transport module for feeding a business reply mail piece returned by a responder, the business reply mail piece having a first side including address information and a second side including control data and field data thereon, the field data including information provided by the responder, the control data including image capture instructions for the business reply mail piece, identification information for the business reply mail piece, and processing instructions for the business reply mail piece;

a scanner module associated with the transport module to create an image of the business reply mail piece based on the image capture instruction data; and a control module in operative communication with the scanner module, the control module obtaining the control data on the business reply mail piece from the image of the business reply mail piece, the control module using the identification information to identify the business reply mail piece as belonging to a specific mailing campaign and using the processing instructions to control processing of at least a portion of the field data obtained from the image of the business reply mail piece.

9. The business reply mail processing system of claim 8, wherein the control data further includes instructions for interpreting the at least a portion of the field data obtained from the image of the business reply mail piece.

10. A business reply mail processing system comprising:

a transport module for feeding a business reply mail piece, the business reply mail piece including control data and field data thereon;

a scanner module associated with the transport module to create an image of the business reply mail piece;

a control module in operative communication with the scanner module, the control module obtaining the control data on the business reply mail piece from the image of the business reply mail piece, the control module using the control data to control processing of at least a portion of the field data obtained from the image of the business reply mail piece; and a database coupled to the control module, wherein the control data includes a job identification code, the control module using the job identification code to access processing data from the database corresponding to the job identification code, the processing data including instructions for processing at least a portion of the field data from the image of the business reply mail piece.

11. A method of operating a business reply mail processing system comprising:

feeding a business reply mail piece returned by a responder in a path of travel, the business reply mail piece having a first side including address information and a second side including processing data and field data thereon, the field data including information provided by the responder, the control data including identification information for the business reply mail piece and instructions for scanning the field data;

scanning the business reply mail piece to read the processing data;

using the identification information to identify the business reply mail piece as belonging to a specific mailing campaign; and using the instructions for scanning the field data to control the scanning and reading of at least a portion of the field data from the business reply mail piece.

12. The method of claim 11, further comprising:

if the processing data includes an appropriate instruction, obtaining an image of the business reply mail piece.

13. A method of operating a business reply mail processing system comprising:

feeding a business reply mail piece in a path of travel, the business reply mail piece including processing data and field data thereon, the processing data including a job identification codes;

scanning the business reply mail piece to read the processing data;

using the processing data to control the scanning and reading of at least a portion of the field data from the business reply mail piece; and directing the business reply mail piece to a particular one of a plurality of output bins associated with the job identification code.

14. A method of operating a business reply mail processing system comprising:

feeding a business reply mail piece in a path of travel, the business reply mail piece including processing data and field data thereon;

scanning the business reply mail piece to read the processing data;

using the processing data to control the scanning and reading of at least a portion of the field data from the business reply mail piece;

reading a recipient identification code from the business reply mail piece; and updating a database to reflect that the business reply mail piece corresponding to a particular recipient has been received.

15. A method of operating a business reply mail processing system comprising:

feeding a business reply mail piece in a path of travel, the business reply mail piece including processing data and field data thereon, the processing data including a job identification code;

scanning the business reply mail piece to read the processing data;

using the processing data to control the scanning and reading of at least a portion of the field data from the business reply mail piece;

using the job identification code to access post processing data from a database corresponding to the job identification code, the past processing data containing indications of possible output activities; and outputting selected ones of the possible output activities by correlating the post processing data and the field data.

16. A method of operating a business reply mail processing system comprising:

feeding a business reply mail piece in a path of travel, the business reply mail piece including processing data and field data thereon;

obtaining an image of the business reply mail piece:

obtaining the processing data from the image:

controlling the processing of the field data obtained from the image of the business reply mail piece based on the processing data obtained from the image;

obtaining a recipient identification code from the image of the business reply mail piece; and updating a database to reflect that the business reply mail piece corresponding to a particular recipient has been received.

17. A method of operating a business reply mail processing system comprising:

feeding a business reply mail piece in a path of travel, the business reply mail piece including processing data and field data thereon, the processing data including a job identification code;

obtaining an image of the business reply mail piece;

obtaining the processing data from the image;

controlling the processing of the field data obtained from the image of the business reply mail piece based on the processing data obtained from the image;

using the job identification code to access post processing data from a database corresponding to the job identification code, the post processing data containing indications of possible output activities; and outputting selected ones of the possible output activities by correlating the post processing data and the field data.

18. A business reply mail piece, comprising:

a first side including address information used for delivery of the business reply mail piece; and a second side including control data, the control data including identification information to identify the business reply mail piece as belonging to a specific mailing campaign, the second side further including at least one area for field data to be provided by a responder, wherein the control data further includes information for processing and interpreting the field data.

19. The business reply mail piece of claim 18, further comprising:

a recipient identification code corresponding to a particular recipient that the business reply mail piece was provided to.

* * * * *